March 30, 1965 R. A. NEWEY ETAL 3,175,803
METHOD OF SECURING RUNNER BLADES TO KAPLAN TYPE TURBINE HUBS
Filed Jan. 15, 1963 2 Sheets-Sheet 1

INVENTORS.
ROBERT A. NEWEY
VICTOR G.M. CHATFIELD
BY
Raymond A. Paquin
ATTORNEY.

March 30, 1965  R. A. NEWEY ETAL  3,175,803
METHOD OF SECURING RUNNER BLADES TO KAPLAN TYPE TURBINE HUBS
Filed Jan. 15, 1963  2 Sheets-Sheet 2

INVENTORS.
ROBERT A. NEWEY
VICTOR G.M. CHATFIELD
BY
ATTORNEY.

United States Patent Office 3,175,803
Patented Mar. 30, 1965

3,175,803
METHOD OF SECURING RUNNER BLADES TO KAPLAN TYPE TURBINE HUBS
Robert A. Newey, Lachine, Quebec, and Victor G. M. Chatfield, Lasalle, Quebec, Canada, assignors to Dominion Engineering Works, Limited
Filed Jan. 15, 1963, Ser. No. 251,659
1 Claim. (Cl. 253—31)

This invention relates to hydraulic turbine runners of the Kaplan type. More specifically it deals with improved means for mounting the blades in the runner hub whereby the cost of roller bearings for the blade trunnions may be reduced, particularly in machines of large size where the roller bearings in conventionally designed hub assemblies are excessively expensive.

Conventional means employed to prevent the outward movement, due to centrifugal force, of runner blades of this type, comprise:

(a) A machined annular groove in the trunnion and semi-circular keys;

(b) A threaded portion on the trunnion with matching nut.

In both (a) and (b) the centrifugal force of the blade is resisted by a thrust bearing housed in the outer shell of the runner hub.

The space required for the conventional arrangement of journal and thrust bearings for the blade trunnions, is incompatible with the relatively small hub diameter dictated by considerations of hydraulic efficiency, in that the conventional execution prescribes thrust bearings larger than demanded by the thrust load.

An important feature of this invention is that the trunnion and runner blade may be manufactured as separate components so that the trunnion may be assembled into the hub separately from the blade.

In the assembly according to this invention, for each blade, there is a radial tension member located within the hollow trunnion and fixed at its inner end to the runner hub structure.

The outer end of each tension member carries a flange, between which and at the outer end of the trunnion, is located a thrust bearing of smaller diameter than the outer end of the trunnion. The blade root is then bolted to that portion of the outer end of the trunnion which extends beyond the outside diameter of the thrust bearing.

A tension member transmits the centrifugal force of the blade to the central structure of the hub, without the necessity of keys or nuts to locate the blade radially in relation to the hub.

Figure 1:
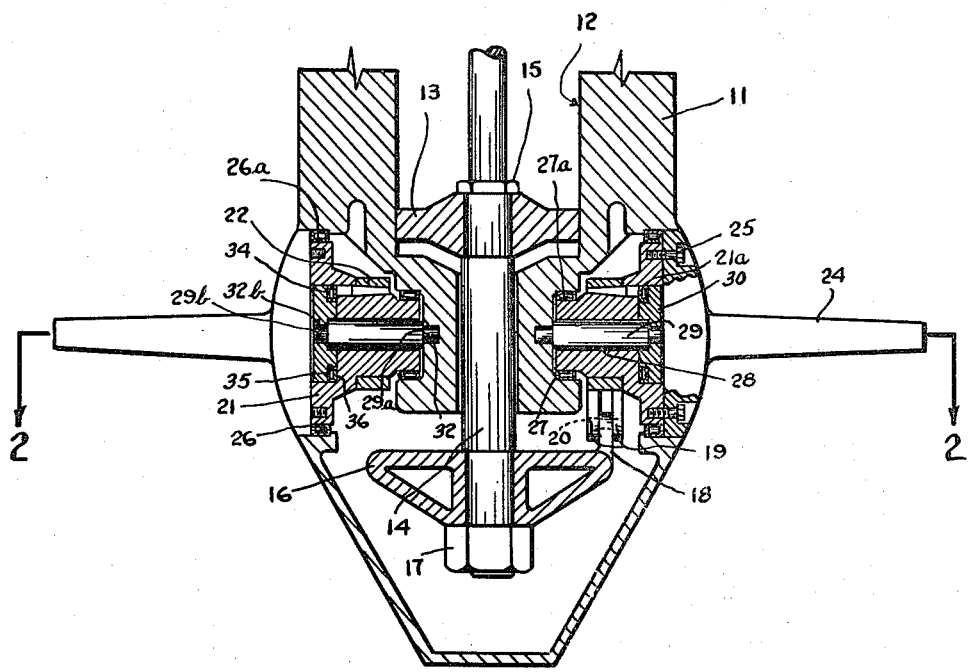
Figure 2:
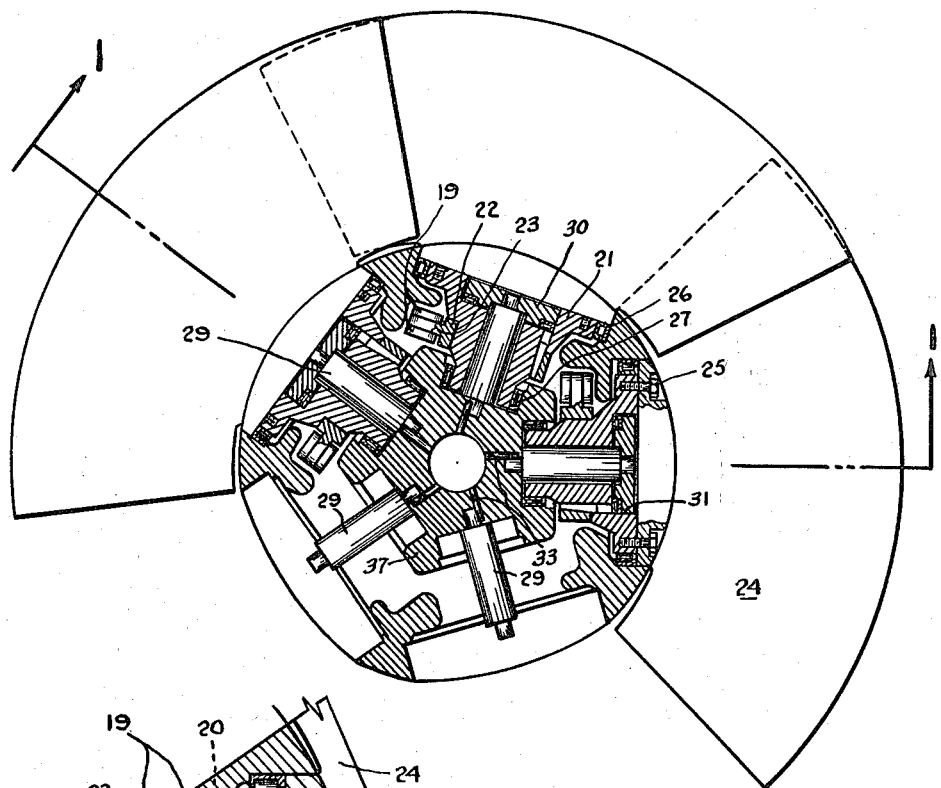

Referring more particularly to the drawings, wherein similar reference characters designate corresponding parts throughout, FIG. 1 is a vertical section of a typical Kaylan runner hub through line 1—1 of FIG. 2, incorporating the preferred execution of the invention.

FIG. 2 is a horizontal section on line 2—2 of FIG. 1.

Figure 3:
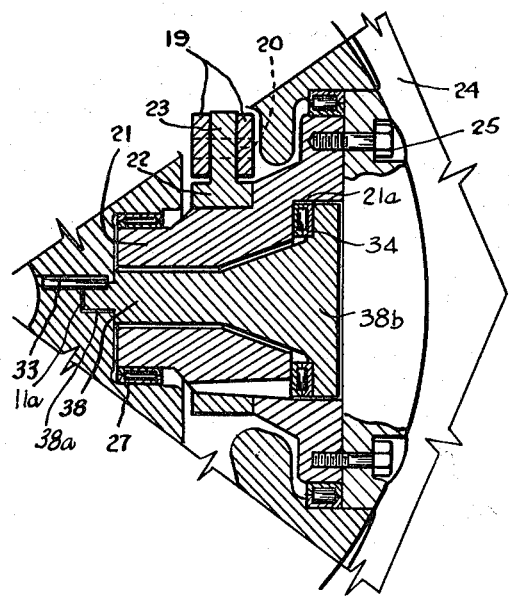

FIG. 3 is a fragmentary horizontal section corresponding with FIG. 2 but incorporating alternative executions of some details. Referring to the figures runner hub 11 is provided with a bore 12 which constitutes the bore of the cylinder of a blade actuating servo motor. Servo piston 13 is secured to piston rod 14 by threaded nut 15. Crosshead 16 is attached to the end of piston rod 14 remote from servo piston 13 by nut 17.

Crosshead 16 is formed with integral lugs 18 to which blade actuating links 19 are operably connected by linkpins 20. Actuating lever 22 is rigidly attached to blade trunnion 21 and is operably connected to the end of link 19 remote from lug 18, by linkpin 23. Trunnion 21 is attached to blade 24 by bolts 25.

It will be seen from the foregoing, that the pitch of blades 24 may be changed by movement of servo piston 13 through the medium of crosshead 16, links 19 and levers 22.

Trunnion 21, is journalled in hub 11, by outer journal bearings 26 and inner journal bearings 27. Trunnion 21 is provided with a through bore 28, which is coaxial with diameters 26a and 27a. Threaded portion 29a of tension member 29 engages threaded counterbore 32 in the central structure 37 of hub 11 and is locked in position by taper pin 33. A recess 21a is provided in the trunnion 21 to support a thrust bearing 34.

Threaded portion 29b at the end of tension member 29 remote from threaded portion 29a, engages the thread in hole 32b centrally located in flanged thrust ring 30 whereby flanged thrust ring 30 is fastened to tension member 29.

The thrust bearing 34 is mounted in the trunnion recess 21a between thrust face 35 of thrust ring 30 and thrust face 36 of trunnion 21. The centrifugal force due to blade 24 is transmitted to trunnion 21 by bolts 25 and from trunnion 21 to thrust ring 30 by way of roller thrust bearing 34. The centrifugal force is then transmitted from thrust ring 30 to central structure 37 of hub 11 by tension member 29.

FIG. 3 shows an alternative arrangement wherein tension member 29 and thrust ring 30 are combined in one piece 38. Integral part 38b acts as the thrust ring. The opposite end of the tension member 38 is threaded at 38a for engagement with the threaded portion 11a in the central structure 37 of hub 11. Thrust bearing 21a is shown located in the recess 34 in contact with the trunnion 21 and the thrust ring portion 38a of the tension member 38.

From the foregoing it will be seen that we have provided new and improved means for obtaining all of the objects and advantages of the invention.

We claim:

In a runner for a Kaplan turbine, a hub having a plurality of cavities extending radially into it and terminating in central hub structure; an equal number of turbine blades projecting radially from said hub at said cavities; means for operatively supporting each blade on the hub comprising a hollow trunnion located in each cavity with the hollow defining a radial passage from said said central hub structure through the trunnion, said trunnion having an annular recess in its outer end; bearings supporting said trunnion in the hub for rotation about said passage; a tension member located in said passage, secured at its inner end to said central hub structure, and terminating at its outer end in a flanged portion overlaying said recess; a thrust bearing in said recess between said flanged portion and said trunnion; means for securing the root end of a blade to the outer end of each trunnion; and a mechanism in said hub for simultaneously rotating said trunnions and thereby adjusting the angle of the blades.

References Cited by the Examiner
UNITED STATES PATENTS

| | | | |
|---|---|---|---|
| 1,950,117 | 3/34 | Lanzerotti et al. | 170—160.58 |
| 2,470,517 | 5/49 | Obrist | 170—160.58 |
| 2,473,899 | 6/49 | Murphy | 170—160.58 |
| 2,515,037 | 7/50 | Hardy | 170—160.62 |
| 2,583,369 | 1/52 | Fumagalli | 170—160.14 |

KARL J. ALBRECHT, *Primary Examiner.*
JOSEPH H. BRANSON, JR., *Examiner.*